Feb. 4, 1969  K. Z. REHRER  3,425,231

DIVING DEVICE

Filed June 27, 1967  Sheet 1 of 2

INVENTOR.
KENNETH REHRER

BY Paul + Paul
ATTORNEYS.

United States Patent Office 3,425,231
Patented Feb. 4, 1969

3,425,231
DIVING DEVICE
Kenneth Z. Rehrer, 3400 N. 11th St.,
Philadelphia, Pa. 19140
Filed June 27, 1967, Ser. No. 649,303
U.S. Cl. 61—69          5 Claims
Int. Cl. B63c 11/46; E02b 17/00

ABSTRACT OF THE DISCLOSURE

A cage is constructed of interconnected hollow pipes which form an airtight chamber, mounted on an airtight tank. Both the chamber and the tank have valve connections for bleeding air out, allowing water to enter, and forcing the water out. The cage may be lowered into the water by any suitable means.

Cross-references to related applications

Reference is made to United States patent application Ser. No. 624,559, filed Mar. 20, 1967, now Patent No. 3,384,043, entitled, "Sport Fishing Device."

Background of the invention

This invention relates to a device for diving to depths, such as 200 feet or more, and more particularly, to a specially designed tank and cage arrangement which enables a human to participate in underwater activities far below the surface of the water. This invention allows such a person to take a large supply of equipment with him and gives him a large measure of security when diving in dangerous waters, such as those inhabited by sharks.

Skin diving has become a popular sport in coastal areas where the weather and water conditions permit. Diving for sharks, however, can be quite dangerous, as can diving for other fish in waters which are frequently inhabited by sharks. Similar hazards are faced by anyone wishing to take pictures underwater, or to pursue other activities, such as salvage operations, in waters infested by sharks.

In my copending application, referenced above, I disclosed a new and novel boat and cage arrangement which provided mobility and security for underwater pleasure seekers. The cage-like structure disclosed therein, was connected to the boat and actually formed a part of it. It will be appreciated that there most probably will be physical limitations to the depth to which such a device can be lowered.

To provide a measure of flexibility in the use of a protective device for underwater pleasure seekers, I have invented an improved cage which I disclose herein.

Summary of the invention

The present invention comprises a cage capable of submersion from any structure mounted above or upon the surface of the water, which cage is in open and free communication with the surrounding environment and includes novel means for submerging and stabilizing the cage under the water, whereby a person may move relatively freely at depths of 200 feet or more beneath the surface of the water in a protected area which allows for relatively free communication with the water. In the preferred embodiment of my invention, the cage is provided with access means, so that one involved in underwater activities can leave and return to the cage while underwater.

Accordingly, an objet of this invention is to provide a means for protecting a person engaged in underwater activities from dangerous creatures living in such water, while simultaneously permitting such person to freely engage in such activity.

Another object of this invention is to provide a means to permit underwater pleasure seekers to be easily submerged in a protective device with their equipment and to pursue their pleasure relatively uninhibited while at the same time receiving protection from sharks, which protective device can be easily raised and lowered from any structure above or upon the surface of the water to a depth of 200 feet or more.

A further object of this invention is to provide in a device, in accordance with the previous object, means permitting such person easy access and egress to and from the proteted area.

Description of the preferred embodiments

Figure 1:
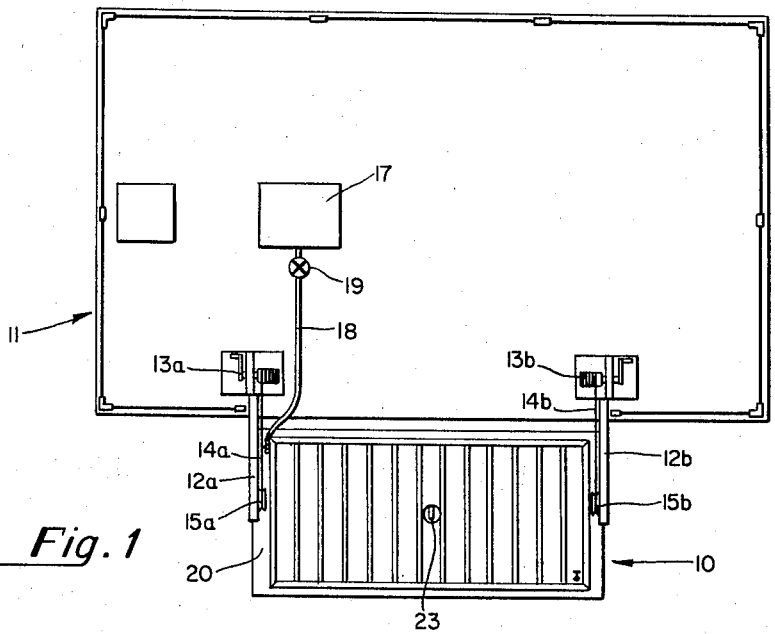
FIG. 1 is a plan view of the device, according to the preferred embodiment of this invention, shown mounted to a structure above the surface of the water in position for being lowered into the water.

Although specific forms of the invention have been selected for illustration in the drawings, and the following description is drawn in specific terms for the purpose of describing these forms of the invention, this description is not intended to limit the scope of the invention which is defined in the appended claims.

Referring to the figures, the cage designated 10, FIG. 1, is shown mounted to the side of a flat bottomed barge designated 11 by means of the jib cranes 12a and 12b. The winches 13a and 13b, which may be hand operated or motor driven as desired, are adapted to take-up and play-out cables 14a and 14b respectively, which pass over the pulleys 15a and 15b on the jib cranes 12a and 12b respectively, and are attached to the deck 20 of the cage 10 by any suitable means, as at 16, FIG. 2. A compressor 17, FIG. 1 is mounted on the deck of the barge 11 and has a fluid pressure line 18 connected to the discharge thereof to supply compressed air to the cage, as will be more fully explained hereinafter.

Figure 2:
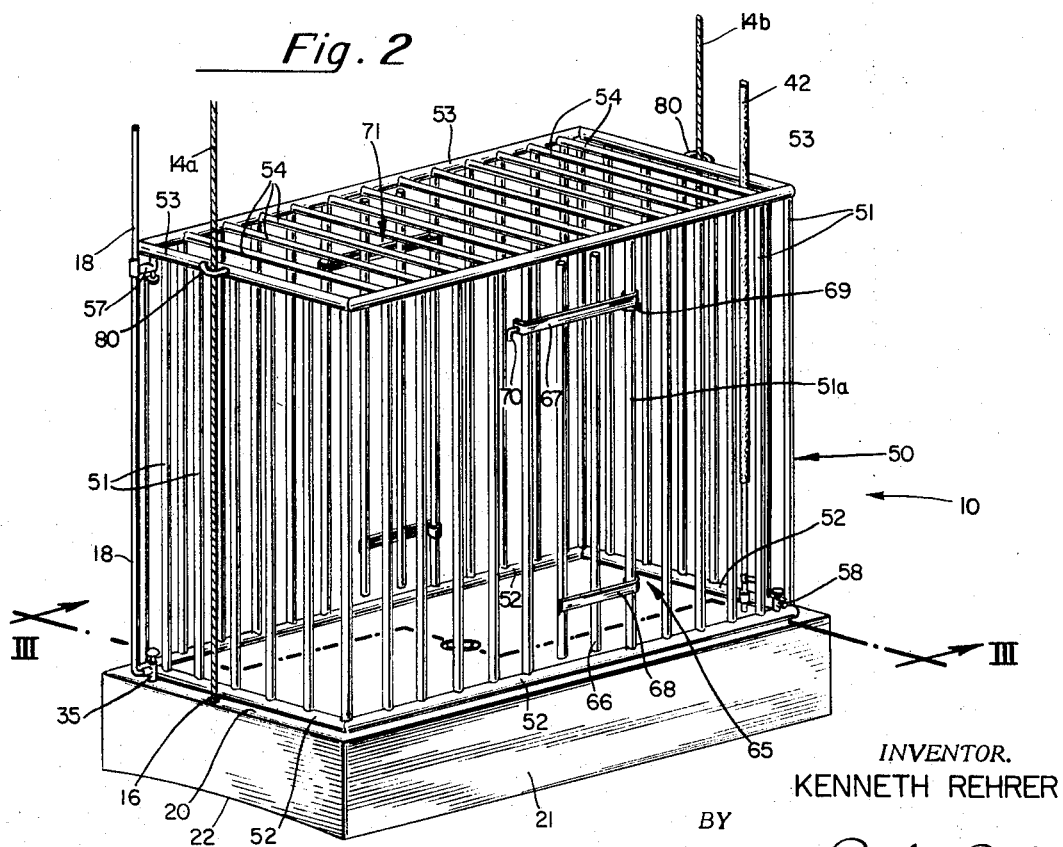
FIG. 2 is a perspective view of the device according to the preferred embodiment of this invention.

Referring to FIG. 2, the cage 10 comprises a deck 20 upon which is mounted an open frame structure 50 forming the protective cage area. The frame structure 50 is composed of a plurality of hollow pipes, which will be more fully described hereinafter. The deck 20 forms the upper surface of a tank 21 which is a sealed box-like structure having a bottom portion 22 which is concave along the longer longitudinal axis. This concavity aids in stabilizing the cage, as will be more fully explained hereinafter.

Figure 3:
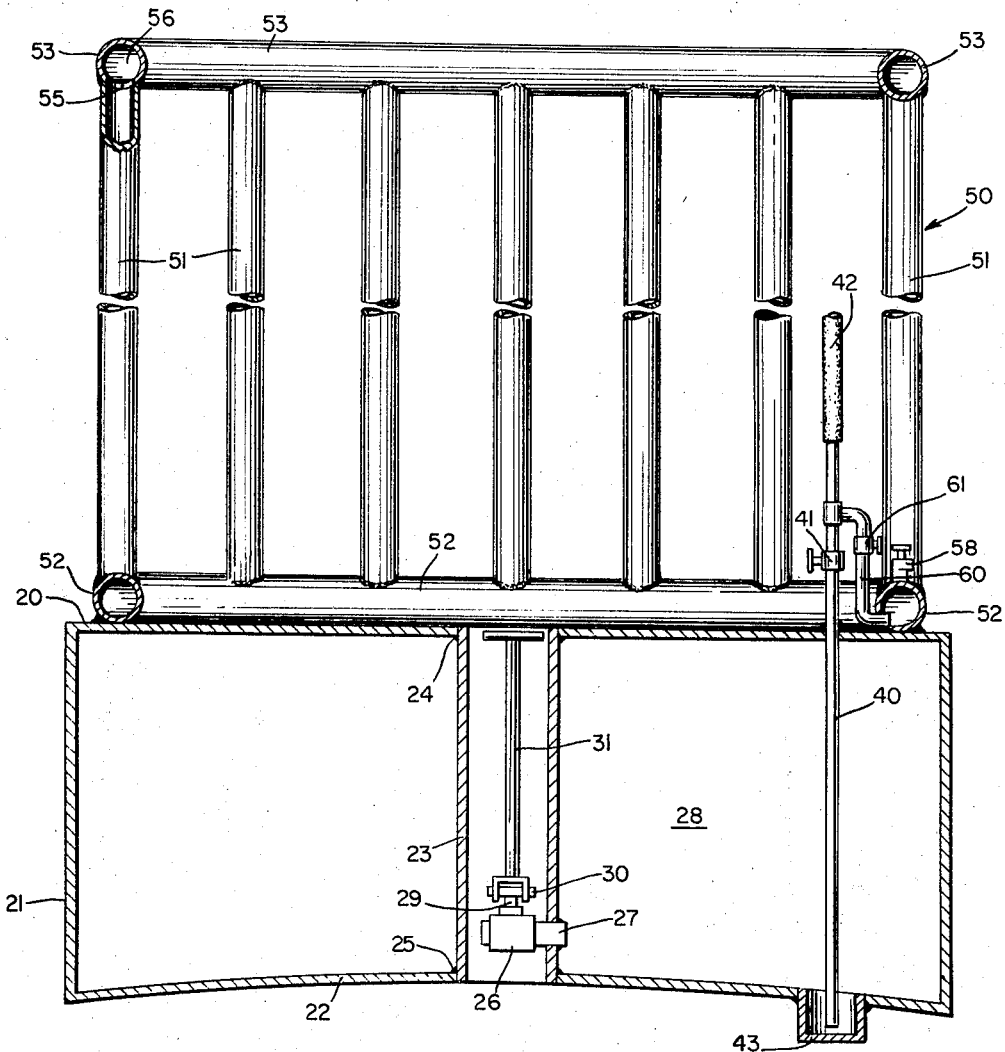
FIG. 3 is a section taken along the line III—III of FIG. 2.

Referring to FIG. 3, a pipe 23 is shown passing from the deck 20 through the bottom portion 22 of the tank 21. The pipe is preferably welded in place, as at 24 and 25, to form sealed, watertight connections. The pipe is preferably disposed in the center of the tank 21, as shown in FIG. 2 to distribute the water over the bottom of the inside of the tank. Within the pipe 23 there is a valve 26. The valve 26 is connected to a short length of pipe 27, which passes through the wall of the pipe 23 and is preferably welded thereto to form a sealed connection. By this arrangement, water flowing through the pipe 23 when the valve 26 is open will enter the chamber 28 of the tank 21. The valve 26 has a stem portion 29 which terminates in a handle 30. A reach rod 31 engages the handle 30 and projects to a point just below the level of the deck 20. When the valve 26 is closed, by means of the reach rod 31, water cannot flow into tank 21. When the reach rod 31 is rotated, the handle 30 of the valve 26 is rotated and the valve will be opened so that water will flow into the chamber 28 within the tank 21.

Referring once again to FIG. 2, the fluid pressure line 18 terminates in a valve 35 for controlling the flow of fluids therethrough. The valve 35 is mounted to the deck 20 and is in fluid flow communication with the chamber 28 within the tank 21, so that the valve 35 controls the flow of pressure fluid through the line 18 into the chamber 28. A suitable multiposition valve 19 is provided at the compressor 17, FIG. 1, in the line 18, so that as water is allowed to enter the chamber 28 through the valve 26, the air in the chamber may pass out through the line 18 and the valve 19.

A stand pipe 40, FIG. 3 is mounted through the deck 20 and in sealed engagement therewith. The stand pipe has a valve 41 for regulating the flow of fluid therethrough. The upper end of the stand pipe 40 is connected to a flexible hose 42 which is of sufficient length so that a portion of it (not shown) remains on the deck of the barge 11 as the tank 21 submerges. The other end of the stand pipe is disposed in the chamber 28 below the level of the bottom portion 22 in a well or sump 43. The stand pipe functions to permit water in the chamber 28 to be exhausted from the tank 21 when air is introduced into the chamber 28 through the valve 35. The effects of this procedure will be described more fully hereinafter in connection with the operation of the device.

The pipes forming the open frame structure 50 also form a similarly submersible sealed chamber. The frame structure 50 comprises a plurality of hollow vertical stand pipes 51, FIG. 2, which are in sealed engagement and rigidly connected to the hollow horizontal pipes 52 and 53 at either end which define the outer boundaries of the cage. The pipes 52 are welded to the deck 20. Across the top of the frame structure 50, there are a plurality of hollow horizontally extending pipes which are similarly connected to the horizontal pipe members 53, thereby forming a sealed chamber 56 within the pipes; all of the pipes being interconnected with their hollow portions in fluid flow communication (as for example at 55, FIG. 3).

The pressure fluid line 18 is connected to the chamber 56 (FIG. 3) within the pipes forming the frame structure 50, by means of valve 57, FIG. 2. A second valve 58 is mounted on one of the lower horizontal support members 52 preferably at the diagonally opposite corner of the frame structure 50 and is in fluid flow communication with the chamber 56, so that water may be introduced therethrough into the chamber 56. The valve 57 functions to control the flow of air into and out of the chamber 56.

A pipe 60, FIG. 3 is shown mounted through the wall of the lower horizontal member 52 and in sealed engagement therewith. The pipe has a valve 61 for regulating the flow of fluid therethrough. The upper end of the pipe is connected to stand pipe 40. The pipe 60 provides a means by which the water in chamber 56 may be exhausted, when air is introduced into the valve 57.

To provide easy access to the caged area, a gate 65 (FIG. 2) is provided in the side of the frame structure 50. The gate comprises several vertical rods 66, which are welded to strap hangers 67 and 68. The hangers 67 and 68 are formed about a vertical pipe 51a, so as to rotate thereabout. A flange 69 is provided fixedly connected to the vertical pipe 51a to retain the strap hanger 67 in its position on the pipe 51a. A suitable catch, as at 70, is provided to secure the gate in its closed position. A similar gate 71 is provided on the opposite vertical side of the cage area.

In operation, a sport fisherman, diver or other user, having entered the cage area through one of the gates with his equipment, will latch the gate and direct a person on the barge 11 to lower the tank into the water, by means of the winches. The winches will then be released so that the cables 14a and 14b may be freely played out. The user will then open the valve 26 and the valve 35 and (assuming the compressor 17 is not operating and the valve 19 is open to permit air to flow out of the hose 18) water will flow into the chamber 28 through the valve 26 and air will pass out of the valve 38, the line 18, and the valve 19. It is likewise assumed that all of the remaining valves are closed. As the chamber 28 begins to fill, the tank 21 will begin to sink. The person inside the cage can control the depth to which the tank 21 will sink by closing the valve 35, thereby preventing the remaining air from escaping the chamber. By having the valve 35 open, however, the chamber 28 will completely fill with water, and the tank will descend to some maximum depth.

Note that the chamber 56 within the pipes of the frame structure 50 is still filled with air. This gives the tank some buoyancy and adds to its stability. It will therefore not sink as far as it could if the air was bled from the chamber 56 and water introduced into said chamber.

The concaved surface of the bottom portion 22 of the tank 21 gives the tank a measure of dynamic stability when it is in the submerged position.

To reach deeper depths, the valves 58 and 57 are opened and the chamber 56 within the pipe frame work begins to fill with water. The buoyancy effect provided in shallower water by the air-filled frame is unnecessary in deeper depths, and therefore, the device will remain upright as it dives still further.

Thus submerged in a protective cage, a user can engage in his particular underwater activity without fear of being attacked by sharks. The spaces between the vertical pipes, being on the order of six inches, are sufficient to allow fishing spears and other gear to be freely used, but are small enough to prevent sharks from passing through. The gates 65 and 71 on either side of the cage, provide easy access and egress to and from the caged area if the user wishes to leave the caged area for any reason while submerged.

When the user wishes to raise the tank 21 once again into its position, as shown in FIG. 1, he signals a person on the deck of the barge 11 to close the valve 19 and start the compressor 17. Air is then forced through the line 18. Simultaneously the user will close the water intake valves 58 and 26, and open the water discharge valves 41 and 61. Air will now pass through valves 35 and 57. It is preferable, however, to close valves 35 and 41 and exhaust the water from the chamber 56 first. This raises the level of the device and insures that the air chamber 56 will provide the required buoyancy in the shallower waters. When the water has been completely exhausted from the chamber 56, valves 57 and 61 are closed. The valves 35 and 41 are opened and the water is exhausted from tank 21 through the stand pipe 40. When the water is substantially completely exhausted from the chamber 28, valves 35 and 41 are closed and the tank will have surfaced. Note that some water will be left in the chamber 28 adjacent to the side of the tank 21 remote from the stand pipe 40, since only one sump has been provided. However, it is to be understood that more than one sump could be provided within the scope of my invention, if desired.

The cables 14a and 14b are not used to raise the tank 21 to the surface of the water in normal operation. They are used, however, to raise the tank from the water, and also in the event that the compressor fails. The hand winches 13a and 13b can be used to raise the tank in either event. Note in this regard that the guides 80 (FIG. 2) at the top of the cage prevent the cage and the tank from being overturned in its ascent.

It will be understood that various changes in the details, materials and arrangement of parts which have been heretofore described and illustrated in order to explain the nature of this invention, may be made by those skilled in the art within the principle and scope of the invention as expressed in the following claims.

It will further be undrstood that the "Abstract of the Disclosure" set forth above is intended to provide a nonlegal technical statement of the contents of the disclosure in compliance with the Rules of Practice in the United States Patent Office, and is not intended to limit the scope of the invention described and claimed herein.

What is claimed is:

1. A diving apparatus comprising: a submersible tank means having regulating means thereon for controlling the flow of water into and out of said tank means, and means forming a cage disposed thereon said cage means comprising a plurality of hollow tubular members fixedly connected in spaced relation and in sealed fluid flow communication with each other to form a chamber, and means for regulating the flow of water into and out of said chamber; air supply means connected to said tank means and said cage means for supplying aid under pressure to said talk means and said chamber and for controlling the flow of air into and out of said tank means and said chamber, whereby said tank means may be adjustably raised and lowered in the water.

2. An apparatus as in claim 1 wherein means are disposed on said cage means to permit access and egress from said cage.

3. An apparatus as in claim 2 wherein said air supply means comprises: compressor means for supplying compressed air; conduit means connecting said compressor means to said tank means and said chamber for supplying air thereto; and means disposed in said conduit means for separately controlling the flow of air into and out of said tank means and said chamber.

4. An apparatus as in claim 1 wherein said water regulating means on said tank means comprises a valve connected to said tank means for controlling the flow of water into said tank means and conduit means connected to said tank means to permit water to be ejected from said tank means.

5. An apparatus as in claim 1 wherein said tank means comprises an airtight tank having a deck portion, said hollow cylindrical members being fixedly connected to said deck portion.

References Cited

UNITED STATES PATENTS

| 889,493 | 6/1908 | Urbanski | 61—69X |
| 934,322 | 9/1909 | King | 61—69X |

JACOB SHAPIRO, *Primary Examiner.*

U.S. Cl. X.R.

61—46.5; 114—16